June 19, 1951 M. H. GOLDSCHEIN 2,557,097
PHOTOGRAPHIC COPYING APPARATUS
Filed Aug. 19, 1948 2 Sheets-Sheet 1
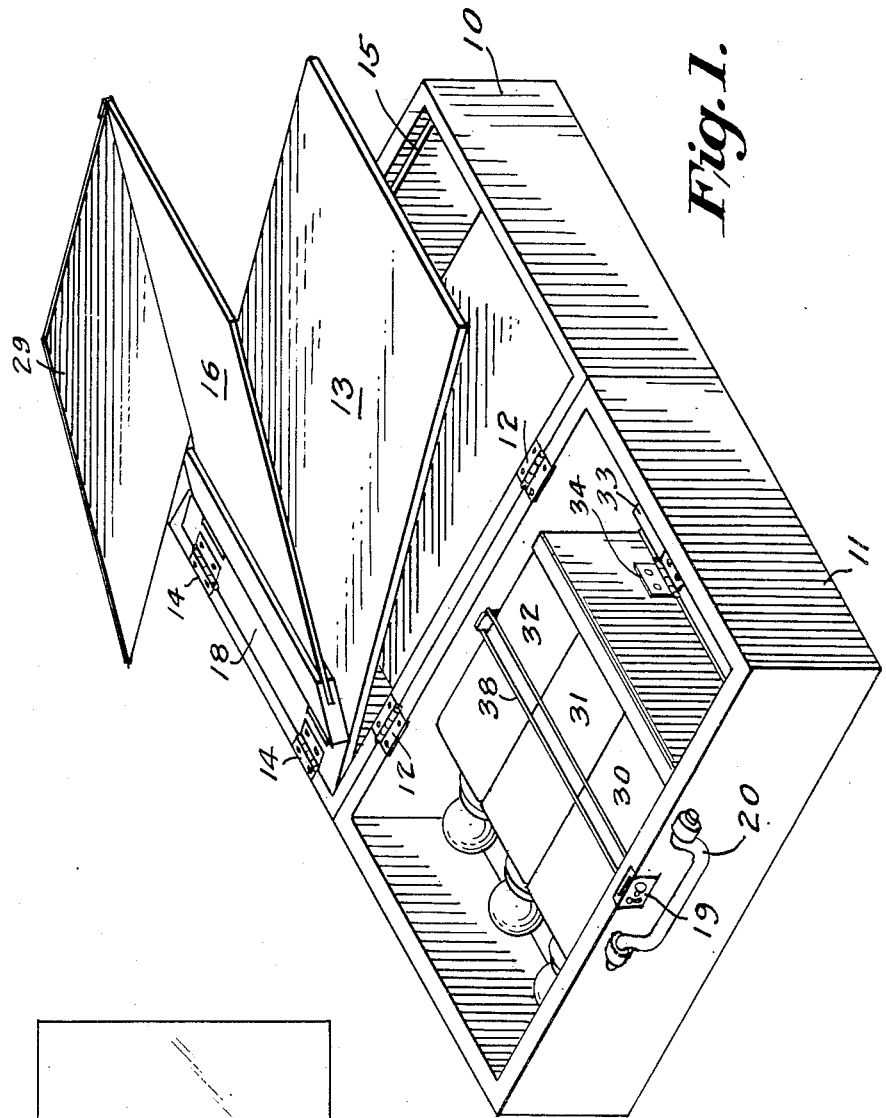
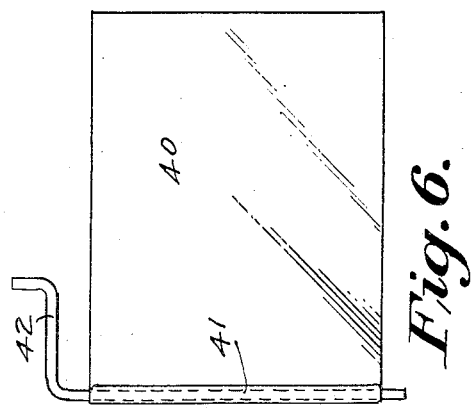
INVENTOR
MAX H. GOLDSCHEIN
BY
ATTORNEY

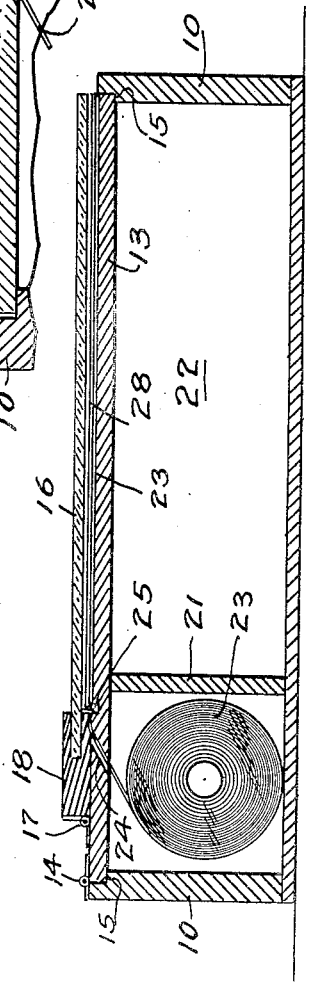

Patented June 19, 1951

2,557,097

UNITED STATES PATENT OFFICE 2,557,097

PHOTOGRAPHIC COPYING APPARATUS

Max H. Goldschein, Washington, D. C.

Application August 19, 1948, Serial No. 45,162

1 Claim. (Cl. 95—73)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a method of and means for photographically copying documents and more particularly to a compact portable means for making such copies and a method for using such means.

It is frequently necessary to make a photographic copy of a document under conditions where the document cannot be removed to a photographic establishment having the customary bulky apparatus, dark rooms, wash water and pans for photographic chemicals. In such a situation it is desirable to have a compact, self-contained, portable apparatus for making such copies.

It is an object of this invention to provide a simple, inexpensive, portable apparatus for producing photographic copies of documents.

It is a further object of this invention to provide a portable apparatus for producing photographic copies of documents, said apparatus containing its own chemicals for fixing and developing.

It is a further object of this invention to provide a method for producing photographic copies of documents, said method being particularly adapted for use where the photographic chemicals are contained in relatively small-mouth receptacles.

Other objects will appear to those skilled in the art from the accompanying specification taken in connection with the accompanying drawing in which:

Fig. 1 is a perspective view of an apparatus embodying the principles of this invention.

Fig. 2 is a side sectional view of the right-hand part of the device shown in Fig. 1.

Fig. 3 is a sectional side view of the left-hand part of the device shown in Fig. 1.

Fig. 4 is a detailed side sectional view of part of the device shown in Figs. 1 and 2.

Fig. 5 is a partial side view of the part seen in Fig. 4 as seen from the reverse direction.

Fig. 6 is a top view of the transparent sheet which may be used for rolling up the exposed sensitized paper for immersion in the photographic chemicals.

As seen in Fig. 1, this device comprises two boxes 10 and 11, each open at one side, hinged together by hinges 12 along one edge of their open sides. Covering the open side of box 10 and hinged to an upper edge thereof by hinges 14 is a cover 13 which can be seated in recess 15 about the edges of the box. As best seen in Fig. 2, this cover 13 has a slot 24 extending therethrough and along the hinged edge to nearly each side. Hinged to cover 13 by hinges 17, at a point between the slot 24 and the edge hinged by hinges 14, is a carrying member 18. Carrying member 18 has a transverse slot running along one edge thereof into which is inserted and fastened a light transmitting, light diffusing plate 16, which may be of glass or plastic. Hinged along one edge of plate 16 is a screen member 29 which is opaque to actinic rays and which substantially covers plate 16. Screen member 29 is made preferably of a thin, flexible sheet such as colored cellophane and is cemented to one side edge of the plate 16, the flexible edge of screen member 29 forming the hinged connection.

A groove 25 which extends only part way through the cover 13 and which may extend all the way across said cover is adapted to receive a cutting blade 26 which is fastened along the under front edge of the carrying member 18.

As seen in Fig. 2, a partition 21 which is near the slot 24 forms an elongated compartment for holding a roll of sensitized photographic paper adapted for making photographic prints. The outer edge of this roll 23 may be pulled through slot 24.

As seen in Figs. 1 and 3, the box 11 contains a carrying member 33 pivoted by hinges 34 which are attached to the bottom of the box 11. As seen in Fig. 3, a holding member 35 is hinged by hinges 36 to the back or bottom of carrying member 33. Bottles 30, 31 and 32, which are preferably of a square cross-section in the interest of saving space and as wide-mouthed as possible to facilitate use, are held on carrying member 33 by holding means which comprises wires 39 attached to either side of carrying means 33 and a resilient tension member 38 connecting the tops of said wires. Said member 38 may be a rubber band or a tension coiled spring.

In Fig. 6 is seen a flexible sheet 40 which may be of cellophane of such a color as to be opaque to actinic light. Along the top edge of sheet 40 is fastened a rod 41 which terminates at one end in the crank 42. Sheet 40 may be so constructed that it has a natural tendency to curl into a cylinder.

In the use of the device described above, it is carried by closing the two boxes 10 and 11, pivoting them about the hinges 12. The device is maintained in a closed position by the fastening means 19 on box 11 which cooperates with a corresponding fastening means (not shown) on box 10. The apparatus may be carried by handle 20.

When a copy is to be made, the device is opened as seen in Fig. 1. Plate 16, along with screen 29, is swung upwardly to expose the top edge of photographic paper 23 protruding from slot 24. The protruding edge of paper 23 is grasped and enough paper is pulled out to permit the making of a contact print from the document to be copied. The roll of sensitized paper 23 is ordinarily arranged so that the paper pulled through slot 24 lays on cover 13 with its emulsion side up.

If the document to be copied is printed only on one side it is laid face up on top of the paper 23, the latter having its emulsion side up. When plate 16 is swung down on the cover 13, the blade 26 enters slot 25 and severs from the rest of the roll the sensitized paper to be exposed. Light from an ordinary incandescent lamp is then directed at the upper surface of the screen member 29 which is swung out of the way to expose the sensitive paper 23 through plate 16. After the sensitized paper has been exposed for the proper length of time, screen member 29 is swung back to cover plate 16 and stop the exposure of the paper 23. The light is removed, plate 16 is swung upwardly and the sensitized paper and the document are removed.

Bottles 30, 31 and 32 are now swung into an erect position, the carrying member 33 swinging about its hinges 34. The holding member 35 is swung to a position perpendicular to the carrying member 33 and maintains the bottles in their erect position. The stoppers are removed from the bottles 30, 31 and 32. The exposed sensitized paper 23 is rolled and dipped first into a developing solution, then into a water bath and then into a fixing solution and back into the water bath. The wet developed print is then squeezed between two pieces of blotting paper which dries it to a large extent and the print is ready for use.

An alternate method of developing found to be useful with this device includes the use of the cellophane sheet 40, seen in Fig. 6. In this method the cellophane sheet 40 is placed under the sensitized paper 23, as seen in Fig. 4. After the exposure, the document 28 is removed. If the sheet 40 has a natural tendency to curl, it is allowed to do so and a tight cylinder results with the outer layer of exposed paper 23 being covered by the outer layer of the sheet 40, the sensitive paper 23 being thus protected from further effective exposure to light. If the sheet 40 has a natural tendency to lie flat, the crank 42 may be used to roll up the sheet 40 and exposed paper 23. The sheet 40 and the sensitized paper 23 now present a compact roll which may be handled mainly by the crank 42. The sheet 40 acts as a carrier and a holding means for dipping the exposed sensitized paper 23 into the bottles 30, 31 and 32. Crank 42 is used to agitate the roll while it is immersed. In Fig. 5, which shows the side opposite that shown in Fig. 4, the crank 42 is clearly shown.

If the document to be copied is printed on both sides, the document is placed under the plate 16 with the printed side to be copied facing upward. The sensitized paper cut off by the blade 26 is reversed and placed over the document with its sensitized side down. The exposure is made and the print developed as described above, the resulting print being a reverse or mirror image negative. This reverse negative with its printed side down is now placed over a new sheet of sensitized paper having its emulsion side up. The exposure and development are carried out as before and a positive print results.

It will also be understood that the hinges 12—12 may be of the type that are separable to allow the box 10 to be more easily carried to a light source for exposure and more convenient use of bottles 30, 31 and 32.

The compartment 22 may be utilized for storing the necessary blotting paper along with extra sensitized paper and chemicals and the sheet 40. This compartment may also be used to carry a small portable light source for use in exposing the sensitive paper. Alternatively, the box 11 could be entirely eliminated and smaller bottles could be stored in compartment 22. In place of the bottles 30—32, the well known plastic tube, sealed at one end and carrying a sponge at the other, could be used. Such tubes are usually used for moistening envelope flaps. The wash water, fixing and developing solutions could each be stored in such a tube which could be used to distribute its contents over the sensitized paper. The screen member 29 may be eliminated, if desired, and has not been shown in Fig. 4.

The apparatus shown above is by way of example only and many modifications will occur to those skilled in the art within the scope of the appended claim.

What is claimed is:

A portable, self-contained, photo-copying apparatus which comprises two identical open box sections laterally hinged together along one side of each so that when said sections are pivoted about said hinges they coact to form a closed box, a substantially light impervious cover member for supporting a light sensitive element thereon hinged to one end and recessed within the opening of one of said box sections, said cover member having a transverse slot extending nearly to the sides thereof and passing completely through said cover parallel to and adjacent to the hinged side, said cover member also having a transverse rectangular groove on its upper surface parallel to said slot and between said slot and the exposure station, a carrying member hinged to said cover member at the end of said cover member near its hinges, said carrying member being so oriented as to completely cover said slot and having one edge thereof aligned with said groove, a downwardly extending cutting blade secured to the edge of said carrying member and aligned with said groove, said blade being adapted to enter said groove when said carrying member is parallel to said cover member, a light transmitting plate carried by said carrying member and adapted to extend over said cover member at said exposure station, an actinically opaque screen which can substantially cover said light transmitting plate hingedly connected with said plate at the lateral edge thereof so that exposure may be prevented when desired, a bottle carrying means hinged to the bottom of said second box section whereby said bottle carrying means will swing from a position parallel and adjacent to the bottom of said second box section to a position perpendicular to said bottom, holding means on said bottle carrying means for supporting a plurality of bottles thereon and a brace member on said carrying means selectively operable to maintain said carrying means in its perpendicular position.

MAX H. GOLDSCHEIN.

REFERENCES CITED

The following references are of record in the file of this patent:

UNITED STATES PATENTS

| Number | Name | Date |
|---|---|---|
| 762,763 | Sanderson et al. | June 14, 1904 |
| 829,936 | Woodill | Aug. 28, 1906 |
| 883,617 | Bragg | Mar. 31, 1908 |
| 1,185,801 | Hutton | June 6, 1916 |
| 2,311,547 | Hutchison | Feb. 16, 1943 |
| 2,336,663 | Wolters et al. | Dec. 14, 1943 |
| 2,351,877 | Rabkin et al. | June 20, 1944 |
| 2,382,806 | Motson | Aug. 14, 1945 |
| 2,386,856 | Houston | Oct. 16, 1945 |
| 2,438,494 | Bullock | Mar. 30, 1948 |

FOREIGN PATENTS

| Number | Country | Date |
|---|---|---|
| 352,243 | France | May 26, 1905 |
| 314,137 | Germany | Sept. 2, 1919 |